(12) United States Patent
Naccache et al.

(10) Patent No.: US 8,074,872 B2
(45) Date of Patent: Dec. 13, 2011

(54) PAYMENT TERMINAL, AND ASSOCIATED METHOD AND PROGRAM

(75) Inventors: David Naccache, Paris (FR); Michael Troumelin, Courbevoie (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 0 days.

(21) Appl. No.: 12/105,947

(22) Filed: Apr. 18, 2008

(65) Prior Publication Data

US 2008/0257954 A1  Oct. 23, 2008

(30) Foreign Application Priority Data

Apr. 20, 2007 (FR) ..................................... 07 02868

(51) Int. Cl.
G06Q 40/00 (2006.01)
G07D 11/00 (2006.01)
G07F 19/00 (2006.01)
G06K 5/00 (2006.01)

(52) U.S. Cl. ............. 235/379; 235/380; 705/35; 705/39

(58) Field of Classification Search .................. 235/379, 235/380, 449, 492, 487; 705/39, 41, 44, 705/14.38, 35
See application file for complete search history.

(56) References Cited

U.S. PATENT DOCUMENTS

| | | | | |
|---|---|---|---|---|
| 4,186,871 A * | 2/1980 | Anderson et al. | ................ | 705/71 |
| 4,341,951 A * | 7/1982 | Benton | ........................... | 705/41 |
| 4,454,414 A * | 6/1984 | Benton | ........................... | 705/41 |
| 4,523,087 A * | 6/1985 | Benton | ........................... | 235/379 |
| 4,562,340 A * | 12/1985 | Tateisi et al. | .................. | 235/379 |
| 4,678,895 A * | 7/1987 | Tateisi et al. | .................. | 235/379 |
| 4,882,473 A * | 11/1989 | Bergeron et al. | ............... | 463/25 |
| 5,475,756 A * | 12/1995 | Merritt | ............................ | 705/73 |
| 5,530,232 A * | 6/1996 | Taylor | ........................... | 235/380 |
| 5,692,132 A * | 11/1997 | Hogan | ........................... | 705/27 |
| 5,770,843 A * | 6/1998 | Rose et al. | ..................... | 235/380 |
| 5,897,625 A * | 4/1999 | Gustin et al. | .................... | 705/43 |
| 6,131,811 A * | 10/2000 | Gangi | ........................... | 235/380 |
| 6,179,205 B1 * | 1/2001 | Sloan | ............................ | 235/382 |
| 6,273,334 B1 * | 8/2001 | Ijichi et al. | ..................... | 235/380 |
| 6,315,195 B1 * | 11/2001 | Ramachandran | ............. | 235/380 |
| 6,473,500 B1 * | 10/2002 | Risafi et al. | ............. | 379/144.01 |
| 6,520,410 B2 * | 2/2003 | Putman et al. | ................. | 235/380 |
| 6,592,044 B1 * | 7/2003 | Wong et al. | ..................... | 235/493 |
| 6,676,017 B1 * | 1/2004 | Smith, III | ..................... | 235/380 |
| 6,715,679 B1 * | 4/2004 | Infosino | ........................ | 235/449 |
| 6,802,776 B2 * | 10/2004 | Lind et al. | ....................... | 463/19 |

(Continued)

OTHER PUBLICATIONS

French Search Report from counterpart foreign Application No. FR 07/02868, Sep. 20, 2007.

*Primary Examiner* — Michael G Lee
*Assistant Examiner* — Suezu Ellis
(74) *Attorney, Agent, or Firm* — David D. Brush; Westman, Champlin & Kelly, P.A.

(57) ABSTRACT

An electronic payment terminal includes a data entry device, a processor and a memory. The memory contains a structure arranged to list at least one customer identifier, a personal identification number and an amount, all associated. The memory also contains a program having comprising instructions for storing, in an example of the structure after entry, the customer identifier and the personal identification number. The same example of the structure is then updated locally by payments out and in made on the terminal on behalf of the customer identified.

11 Claims, 6 Drawing Sheets

U.S. PATENT DOCUMENTS

| | | | |
|---|---|---|---|
| 6,969,320 B2 * | 11/2005 | Lind et al. | 463/25 |
| 7,059,520 B1 * | 6/2006 | Shtesl | 235/449 |
| 2002/0111207 A1 | 8/2002 | Lind et al. | 463/19 |
| 2002/0132666 A1 | 9/2002 | Lind et al. | 463/42 |
| 2002/0165009 A1 * | 11/2002 | Nohara et al. | 455/558 |
| 2003/0155416 A1 * | 8/2003 | Macklin et al. | 235/380 |
| 2003/0218065 A1 * | 11/2003 | Viswanathan | 235/449 |
| 2003/0220834 A1 * | 11/2003 | Leung et al. | 705/14 |
| 2004/0200898 A1 * | 10/2004 | Kepecs | 235/380 |
| 2004/0249710 A1 * | 12/2004 | Smith et al. | 705/14 |
| 2005/0209960 A1 * | 9/2005 | Horihata | 705/39 |
| 2005/0269402 A1 * | 12/2005 | Spitzer et al. | 235/380 |
| 2006/0178937 A1 * | 8/2006 | Rau et al. | 705/18 |
| 2006/0258337 A1 * | 11/2006 | Fujita et al. | 455/414.1 |
| 2008/0021841 A1 * | 1/2008 | Rau et al. | 705/67 |

* cited by examiner

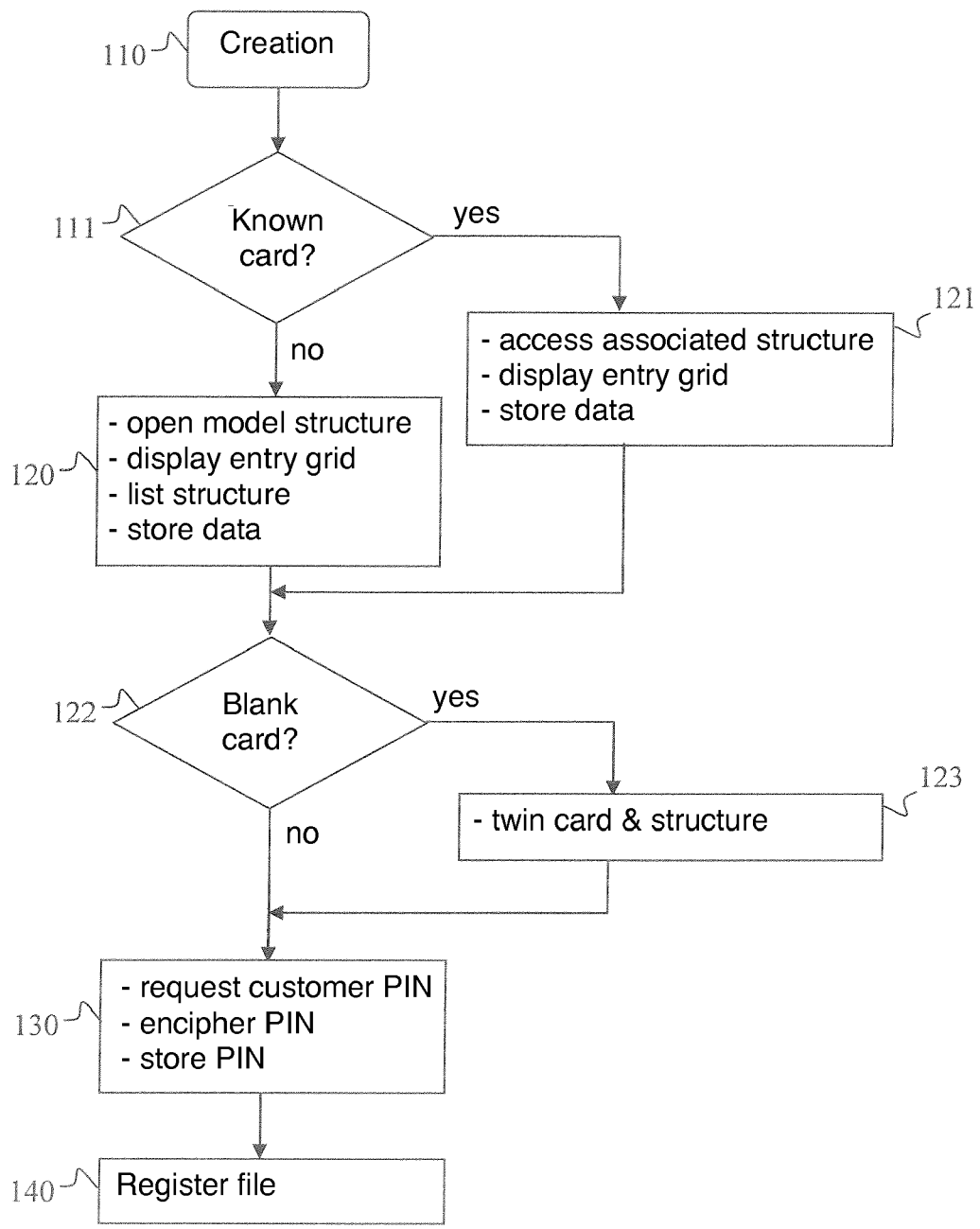

PAYMENT TERMINAL, AND ASSOCIATED METHOD AND PROGRAM

CROSS-REFERENCE TO RELATED APPLICATIONS

None.

FIELD OF THE DISCLOSURE

The field of the disclosure is that of electronic payment means that avoid the manipulation of bank notes or coins for each purchase made from a merchant.

BACKGROUND OF THE DISCLOSURE

Systems and methods of payment by bank card are known. Generally the holder of the bank card must have a bank account and very often pay a subscription, and such systems or methods require a high level of security in order to combat numerous attempts at fraud.

The document EP0979495 B1 indicates a process of the prior art in which a chip card reader adds the amount of a purchase made by means of a card to a total of purchases made by previous purchasers so as to transmit to a bank, for example at the end of the day, this total, which represents a credit to the vendor. To remedy certain types of fraud, the aforementioned document recommends an execution of enciphering algorithms in the chip card by means of a private key and a public key. To make such a system less fragile vis-à-vis fraudsters, the authors prefer to add complications such as a public key certification.

The document WO 01/18756 discloses an electronic purse immediately rechargeable at a point of sale, which is represented by the existence of a second balance at the bank card. The reprovisioning at the point of sale can be offered only on a card back to back with a bank account.

The document WO 03/027919 presents a data processing installation for an electronic purse in which a communication device comprises a so-called "local account" memory so as to transfer data representing a local sum. The communication means are required by the existence of a distant account.

In the light of the aforementioned documents, the centralization and complexity of cryptographic devices seem inevitable in order to ensure that payments by means of electronic devices are made satisfactorily. This is not satisfactory in terms of flexibility and ease of use.

In order to dispense with the need for transactions with a bank, the document FR2827058 discloses a payment system for an electronic purse by means of which a payment is made by deducting a purchase amount from the amount remaining in the memory of the electronic purse. An operation of recharging the electronic purse from a payment terminal avoids the rejection of a purse with a precharged amount when the balance is exhausted.

The latter solution also has certain drawbacks such as the potentiality of fraudulent recharging unless inevitably complex cryptographic devices are used or at least an available or recharging amount is limited. The inconveniences should also be noted that can result from unavailability of the physical medium for the purse when going to a shop through reasons of theft, loss, loan to a friend or to another member of the family, or purely and simply by forgetting.

SUMMARY

An example aspect of the disclosure relates to a credit terminal resident at a merchant.

The credit terminal is produced by means of an electronic payment terminal comprising a data entry device, a processor and a memory containing:
- a structure arranged to list at least one customer identifier, a personal identification number and an amount, all associated;
- a program comprising instructions for storing, in an example of the structure after entry, said customer identifier and said personal identification number.

Thus a customer account can be created and then managed locally in the terminal. A manager of the terminal, typically the merchant, can then credit and debit the account according to sums of money given globally in order to supply the account or the retail price to be paid.

In one embodiment, the terminal comprises means of reading the hardware information medium and the program comprises instructions for twinning the hardware information medium with the example of the structure.

An aspect of the disclosure also concerns a method for making it possible to make a payment locally. The method comprises a step for associating, in a payment terminal, a local account with a customer, and a step for linking to the local account a personal identification number chosen by the customer and for registering said local account in the payment terminal.

Advantageously, in the step for associating the local account with the customer, a physical medium is twinned with said local account.

In particular, the method comprises a step for finding the local account in the terminal.

Advantageously, in the step for finding the local account, the terminal identifies the account by means of said physical medium.

More particularly, the method comprises a step for, in the local terminal, crediting the local account with an amount to be added entered by a manager of the terminal.

A step for, in the terminal, debiting the local account with an amount to be subtracted entered by the manger of the terminal, is subject to a validation of the amount to be subtracted by means of the personal identification number.

Usefully, a receipt is printed in the step for crediting the amount to be added or respectively in the step for debiting the amount to be deducted.

The disclosure also concerns a payment terminal program comprising program code means for performing all the steps of one version or the other of the method when the program is functioning on a payment terminal.

A computer program product comprises program code means stored on a medium that can be read by the payment terminal in order to implement the method when the program product is functioning on a payment terminal.

BRIEF DESCRIPTION OF THE DRAWINGS

Other characteristics and advantages will emerge from a reading of the following detailed description of embodiments of the disclosure, given solely by way of example and with reference to the drawings, which show:

FIG. 4 a logic diagram for implementing steps of the method;

FIG. 5 illustrates a data structure according to an example of the disclosure;

DETAILED DESCRIPTION OF ILLUSTRATIVE EMBODIMENTS

The disclosure relates to an electronic payment terminal comprising a data entry device, a processor and a memory containing a data structure arranged to list at least one customer identifier, a personal identification number and an amount associated with a program comprising instructions for storing, in an example of the data structure after entry, said customer identifier and said personal identification number.

Figure 1:
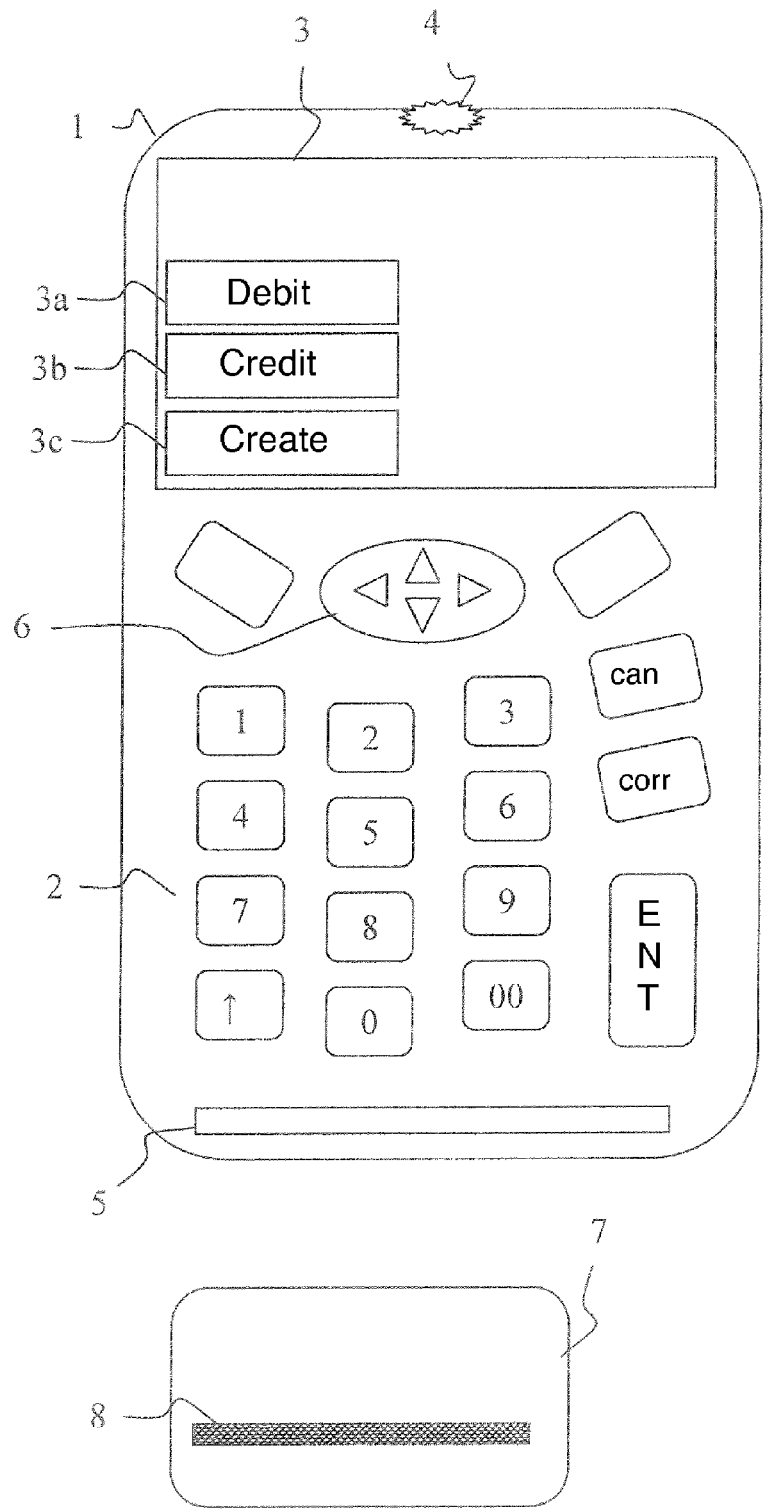
FIG. 1 illustrates a payment terminal according to an aspect of the disclosure.

With reference to FIG. 1, a payment terminal 1 comprises a keypad 2, a screen 3, a communication coupler 4 and a chip card, magnetic card or contactless card reader 5. A payment terminal also comprises other elements not shown here such as for example a printer. The screen 3 is advantageously equipped with a touch pad that makes it possible to perform numeric key functions similar to those of a keypad by pressing on a point on the screen marked by a particular image. It is also possible to provide a ball, a touch pad serving as a mouse or, as shown, a group of arrowed keys 6 for moving a cursor on the screen 3.

Normally, a payment terminal is equipped to perform debit operations. A user introduces a chip card into the reader 5 through a slot, looks at a transaction amount displayed on the screen 3 and, if he is in agreement with paying this amount, enters his PIN code by entering the numbers on the keys of the keypad and validating this code by means of a key provided for this purpose. The terminal then checks the validity of the code by dialoguing with the chip and debits the account of the user by dialoguing in addition with a distant server, not shown, by means of the communication coupler 4. The communication coupler 4 is of a hard-wired nature sometimes encountered at the tills of large stores or of a wireless nature by means for example of electromagnetic waves.

The same normal functionalities of debiting an account on a payment terminal with a card 7 equipped with a permanent memory 8 such as a magnetic strip are found. Functionalities of credit on a payment terminal, apart from electronic purse applications, are rarely found. Unlike normal payment terminals, the credit and debit functions operate neither on an account resident in the card as is the case with the electronic purse, nor on an account resident in a distant server as is the case with banking applications, but on an account resident in the terminal 1 as will be explained below. In addition the terminal 1 as shown in FIG. 1 has account creation functionalities that do not exist on normal terminals.

Figure 2:
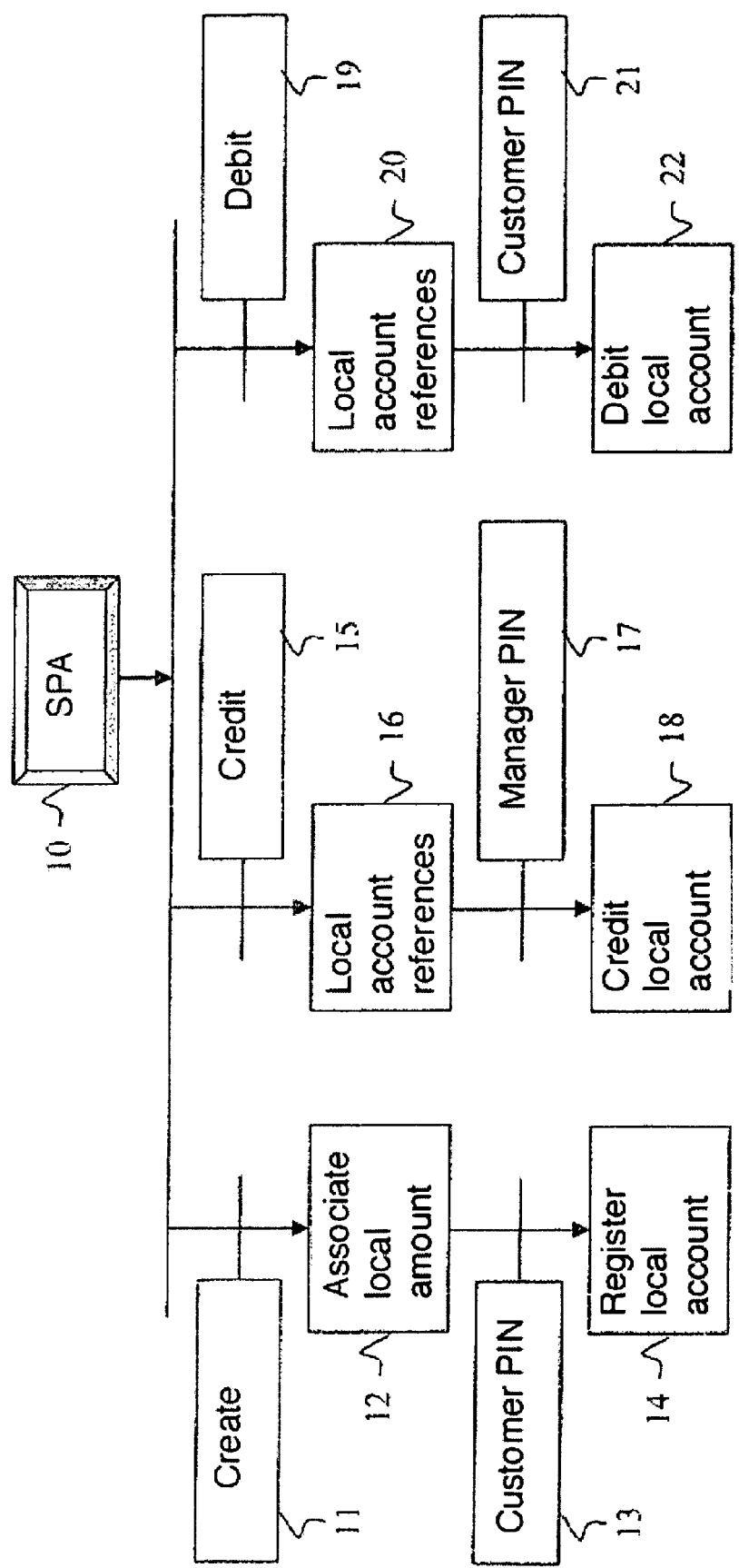
FIG. 2 is a block diagram, which illustrates steps of a method according to an aspect of the disclosure.

With reference to FIG. 2, a description is now given of steps of the method according to an example of the disclosure. A secure or non-secure numerical payment application is in an initial step 10 listening out for predetermined external interactions in order to validate a transition 11, 15, 19.

The transition 11 is validated on detection of a signal issuing a command to create a payment means. This signal is generated by the terminal 1 when a user for example presses a key dedicated to this purpose or a combination of alphanumeric keys on the keypad 2, touches a dedicated touch zone 3c on the screen 3 or positions a curser on the zone 3c by means of the ball 6. Typically the user is in this case the merchant owning the terminal 4.

According to a first variant implementation of the method, the payment means is simply a file in the memory of the terminal 1 arranged to list a credit account that the merchant decides to attribute locally to a customer presenting himself in his shop.

A validation of the transition 11 activates a step 12 that associates the local account with an identification of the customer. This step is typically performed by means of program instructions executable by a processor of the terminal 1 and now described with reference to FIG. 4.

Among several possible embodiments of the program, a first mode associates a different file with each customer. In this first mode, the program comprises instructions 120 for opening a model file, displaying an entry grid on the screen 3, and naming the file opened so as to store the entered data therein. A possible file structure 124 is illustrated in FIG. 5. This file contains various initially empty fields, a first part of which is intended to store the designation of the customer by means for example of the surname, one or more first names, and the address of the residence. A second part is intended to store a money balance available, positive or zero, or even negative if the merchant so accepts. The reference of the file is then simply the name of the file. The file can comprise other fields intended to store other data such as a date of modification of the balance or a personal identification number (PIN).

A second embodiment associates with each customer a line of a table in the form of the structure 124 shown in FIG. 5 by means of a line reference contained in a common file. In this second embodiment the program comprises instructions 120 for opening the common file, displaying the entry grid on the screen 3, and generating a new empty line on the model of the structure shown in FIG. 5, in order to store therein the entered data.

Whatever the embodiment chosen, the structure 124 resides in the terminal 1.

In step 12, the entry grid displayed on the screen enables the user, preferably an administrator such as for example the merchant, to fill in the structure 124 with the details of the customer by means of the keypad 2 or any other suitable device.

The program comprises instructions 130 for requesting a personal identification number (PIN) and storing the PIN when the grid is complete. An entry window opens on the screen 3 with a message of the "enter customer personal number" type. When the entry window opens on the screen, the merchant invites his customer to imagine a PIN and to enter it on the keypad of the terminal 1, keeping it secret. The merchant has no knowledge of the PIN. The customer approves the data displayed in the entry grid by entering his PIN on the keypad and ending by pressing a validation key on the terminal 1. The instructions 130 are preferentially also designed to encipher the PIN and possibly mask the value of the PIN on the screen when it is entered on the keypad 2. The value of the PIN is stored, preferably enciphered, in the field of the structure 124 provided for this purpose.

The validation of the PIN by the customer has the effect of validating a transition 13 that then activates a step 14 in which the file, newly created in the first embodiment or the common file modified in the second embodiment, is recorded in the permanent memory of the terminal 1.

According to a second variant embodiment of the method, the payment means previously described has a physical medium that the customer keeps with him.

The merchant owning the payment terminal procures in advance a packet of blank cards. Blank cards are currently found on the market such as chip cards and/or magnetic strip cards, which can be formatted for other fields than those of bank cards, for example for transport, health, telephone or other fields. Although microprocessor cards can also be used, magnetic strip cards are also suitable for implementing the physical medium of the second variant. What is important in fact is that the physical medium has physical dimensions and a memory arranged so as to enable the payment terminal at least to read therein or even to write therein a value that uniquely distinguishes the physical medium from other physical media. A label of the RFID type with a pre-recorded number may also suit provided that the payment terminal is provided with suitable reading means. In order to make the explanations more fluid, a card will be spoken of whatever the type of physical medium adopted.

In step 12, the merchant submits a blank card to the read/write means of the terminal 1. These read/write means are for example in the form of the slot 5 illustrated in FIG. 1 arranged so as to introduce the card therein. Other read/write means can also be provided, such as those for a magnetic strip or a contactless card. Blank card means a card whose memory is empty or generally no content of which is associated partially or completely with a file implementing the method in the terminal 1.

The previously described creation program comprises instructions 122 for detecting the presence of a blank card. The absence of a blank card can correspond quite simply to the first variant embodiment. A blank card detection then continues with the execution of instructions 123 for twinning the card with the file named by the instructions 120 of the first embodiment or with the line generated by the instructions 120 of the second embodiment. When the card 7 is solely accessible in read mode, twinning consists of reading a card identifier (IDC) in the memory 8 of the card 7 and writing this identifier IDC in a field of the structure 124, provided for this purpose. When in a preferred fashion the card 7 is rewritable, the twinning consists of writing in the memory 8 of the card the reference of the structure 124, associated with the customer. It is also possible to make provision for writing the PIN of the customer on the card provided that access to the memory 8 is protected, as can be achieved with a microprocessor card. Not only for reasons of cost but also for reasons of simplification of cryptographic control against any attack in the payment security field, and even more for reasons of flexibility of use, it is preferred to store the PIN solely in the structure 124. It is easier to protect the PIN by known cryptographic algorithms in the terminal 1. If the customer owning the card no longer holds it for reason of theft or loss, the customer can have more confidence that it will be impossible for a third party holding the card to find the PIN. Certain advantages in terms of flexibility in use will also emerge from the remainder of the description of the method.

By agreement with the merchant, the customer may wish to create another card making it possible to access the structure 124 associated with it either for his personal use in the case of intent to destroy the initial card, or for use by a member of his family, for example his spouse wishing to make purchases at the merchant or his child whom he is sending to do some shopping.

Optionally for this purpose, the creation program contains instructions 101 for detecting a known card. The program then contains instructions 121 for accessing the structure 124 that is associated with the card, displaying the entry grid in precompleted form and storing the newly entered data. The precompleted entry grid avoids having to re-enter all the details of the customer. If the new data entered concern the address, the corresponding field of the structure 124 is simply overwritten by the new data. Where the new data designate a new first name, the instructions 121 are designed to create, in the structure 124, a supplementary field intended to contain the new first name and a supplementary field intended to contain a PIN especially linked to the new first name.

In step 12, the customer presents his initial card to the terminal 1 and indicates to the merchant any additional data to be entered. At the end of entry, the merchant presents a blank card to the terminal and then invites the customer or member of his family to introduce his PIN out of sight.

To avoid cards being created unknown to the owner of the terminal, the program comprises instructions 100 that verify a creation authorization to allow execution of other instructions described with reference to FIG. 4. This verification can take place on detection of a physical key position introduced into a lock of the terminal or on recognition of a personal identification number of which only an administrator of the terminal should have knowledge.

The transition 15 is validated on detection of a signal that gives instructions to credit the payment means. This signal is generated by the terminal 1 when the user for example presses a key dedicated to this purpose or a combination of alphanumeric keys on the keypad 2, touches a dedicated touch zone 3b of the screen 3 or positions a curser on the zone 3b by means of the ball 6. The signal that gives instructions to credit the payment means is, by way of illustration, processed by instructions 150 executable by a processor of the terminal 1. Preferentially the user is here also the merchant who is the administrator of the terminal 4. When the second variant of the method is implemented, it is also possible to make provision for validating the transition 15 simply on detection of an introduction of the card into the reading means 5 of the terminal 1.

The method enables the customer to provision, directly at the premises of the merchant, the local account that is associated with him and which is entirely managed in the payment terminal 1 operated by the merchant. It suffices for the customer to give a sum of money to the merchant, who then credits the amount on the local account in the terminal 1.

Figure 6:
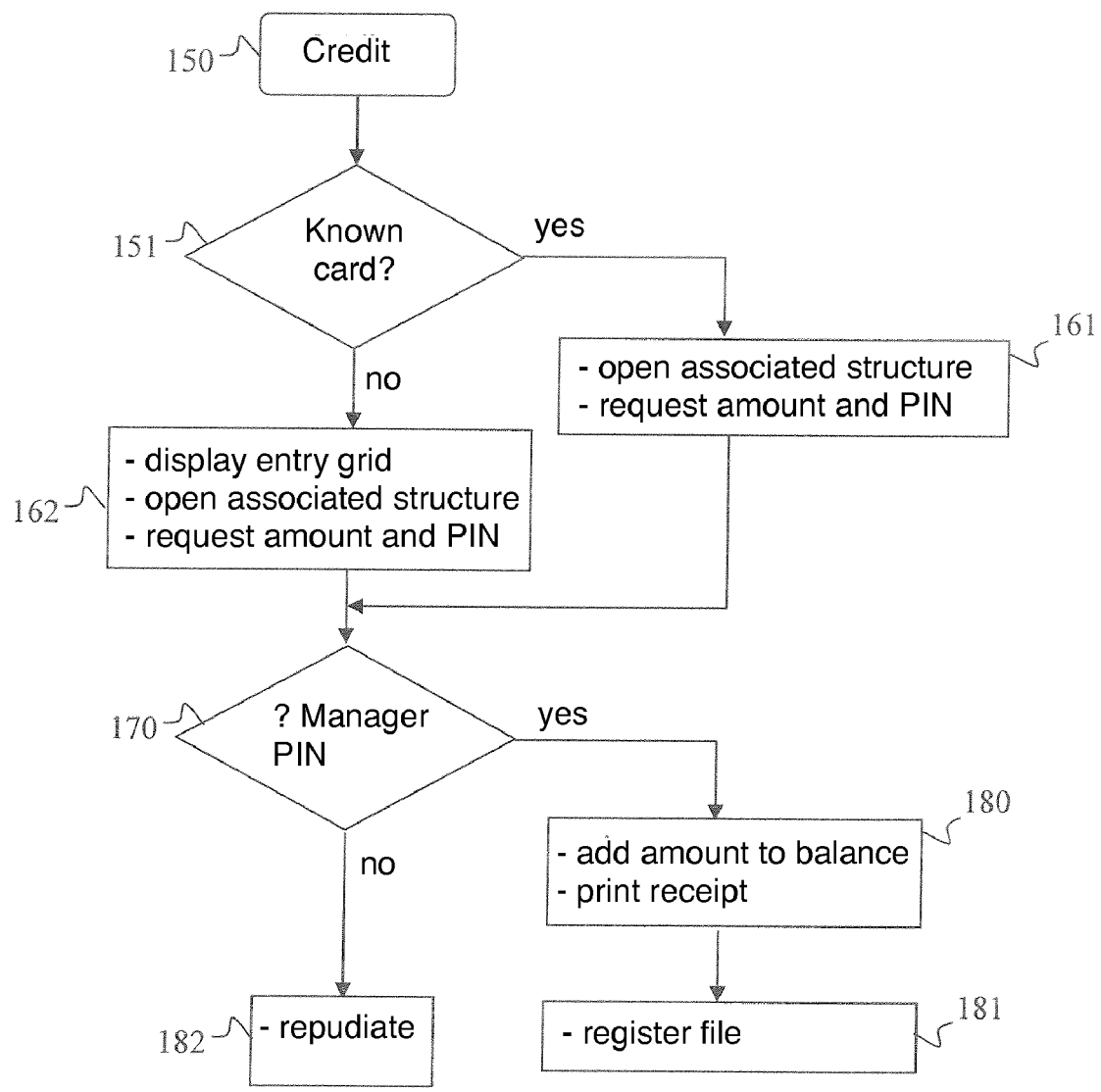
FIGS. 6 and 7 illustrate logic diagrams for operation of the method.

A validation of the transition 15 activates a step 16, which accesses the local account associated with an identification of the customer. This step is typically performed by means of program instructions executable by a processor of the terminal 1 now described with reference to FIG. 6.

In order to implement the first variant of the method that functions without requiring a card like the one created in the context of the second variant, the program comprises instructions 162 for displaying an entry grid, opening the associated structure 124 associated with the data entered and then requesting the amount and the personal identification number of the manager of the terminal.

The second variant of the method avoids the user re-entering the details of the customer to enable the terminal 1 to find the account associated with the customer. The program contains instructions 151 for detecting the existence of a card by the reading means and, in the event of detection, for reading elements of the content that make it possible to verify whether the card detected is a known card, that is to say whether there exists a structure 124 listed in the terminal 1 which is associated with the card. The program contains instructions 161 intended to be executed in the case of a positive response to the test instructions 151, so as to open the associated structure 124 and then request the amount and the personal identification number of the manager of the terminal.

Whatever the variant of the method used, it is possible to make provision for displaying, on the screen 3 of the terminal 1, the amount of the last balance recorded in the structure 124, the amount of the sum to be credited and the amount of the new balance.

The program comprises instructions 170 for verifying that the personal identification number given is the PIN of the manager. For this purpose, the terminal 1 has in memory an image of the PIN and the cryptographic means for verifying the match of the code entered by the user with the PIN of the manager.

It is here the PIN of the manager that is requested so as to enable him to validate that the amount to be credited does indeed correspond to a sum of money that has been handed to him. The sum of money may have been handed to him in the form of bank notes, coins or a bank cheque, or even payment by conventional bank card. This enables for example a head of a family to provision his local account globally in order to allow other members of the family to benefit from it or to settle their debts in so far as the merchant accepts a negative balance.

A recognition of the PIN of the manager validates a transition 17, which activates a step 18 in which the local account attributed to the customer is credited with the amount of the sum displayed and validated. Advantageously, in step 18, a receipt is printed and communicated to the customer in order to help him to remember the sum paid, the date of payment and his new balance after payment.

Independently of the alternative embodiment adopted, the program comprises instructions 182 for repudiating the operation previously described in the event of a negative response to the verification carried out by the instructions 170. The program comprises instructions 180 for adding the validated amount to the credit of the local account and for possibly printing a receipt, in the case of positive response to the verification executed by the instructions 170. Finally, the instructions 181 are designed to register the file that hosts the structure 124.

The transition 19 is validated on detection of a signal that gives instructions to debit the payment means. This signal is generated by the terminal 1 when the user for example presses a key dedicated to this purpose or a combination of alphanumeric keys on the keypad 2, touches a dedicated touch zone 3a on the screen 3 or positions a curser on the zone 3a by means of the ball 6. The user may be the manager of the terminal 4 at the start of the execution of a step 20 activated by validating of the transition 19. When the second variant of the method is implemented, it is also possible to make provision for validating the transition 19 simply on detection of an introduction of the card into the reading means 5 of the terminal 1.

The method enables the customer to make purchases by debiting, directly at the premises of the merchant, the local account associated with him and which is entirely managed in the payment terminal 1 operated by the merchant. It suffices to access the local account attributed to the customer in the terminal 1.

Figure 7:
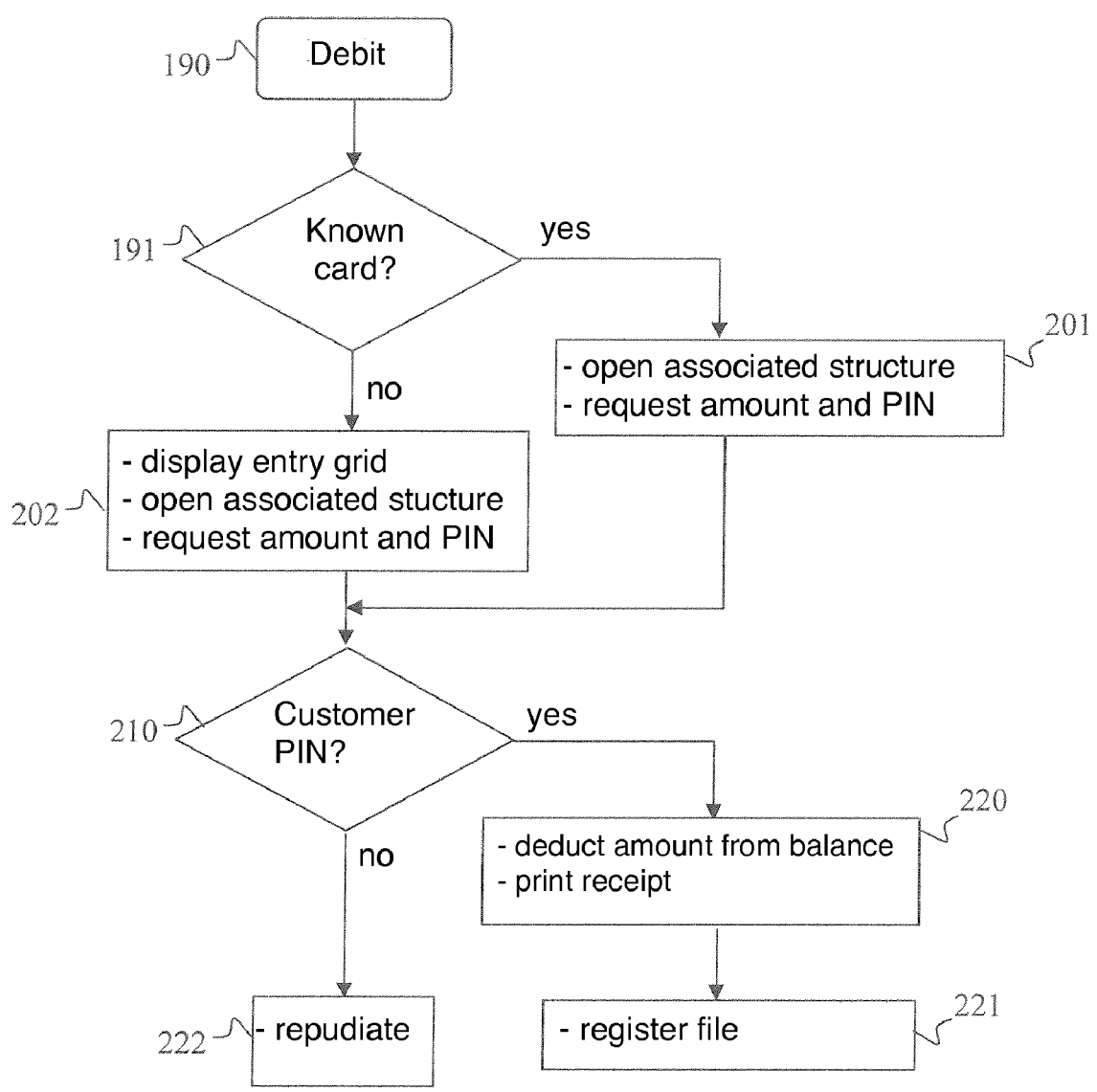

Step 20, activated by validation of the transition 19, accesses the local account associated with an identification of the customer. This step is typically performed by means of program instructions executable by a processor of the terminal 1 now described with reference to FIG. 7.

To implement the first variant of the method that functions without requiring a card such as the one created in the context of the second variant, the program comprises instructions 202 for displaying an empty grid, opening the structure 124 associated with the data entered and then requesting an amount to be debited and the personal identification number of the customer.

The second variant of the method avoids the user re-entering the details of the customer in order to enable the terminal 1 to find the account associated with the customer. The program contains instructions 191 for detecting the existence of a card by the reading means and, in the case of detection, for reading elements of the content that make it possible to verify whether the card detected is a known card, that is to say whether there exists a structure 124 listed in the terminal 1 which is associated with the card. The program contains instructions 201 to be executed in the case of a positive response to the test instructions 191, so as to open the associated structure 124 and then request the amount and the personal identification number of the customer.

Whatever the variant of the method used, it is possible to make provision for displaying, on the screen 3 of the terminal 1, the amount of the last balance recorded in the structure 124, the amount of the sum to be debited and the amount of the new balance.

The program comprises instructions 210 for verifying that the personal identification number given is the PIN of the customer. To this end, the terminal 1 has in memory an image of the PIN and the cryptographic means for verifying the match of the code entered by the user with the PIN of the customer.

It is here the PIN of the customer that is requested so as to enable him to validate that the amount to be debited does indeed correspond to an agreed purchase price. The advantageous possibility of settling a transaction without having recourse to a sum of money in the form of bank notes, coins or bank cheque, or even payment by conventional bank card, will be noted. The advantageous possibility of settling a transaction without having recourse to a centralized account with the constraints that such recourse generates in terms of communications at a distance and protection against possibilities of fraud that may result from an impersonation of centralization means will also be noted.

Recognition of the PIN of the customer validates a transition 21 that activates a step 22 in which the local account attributed to the customer is debited with the amount of the sum displayed and validated. Advantageously, at step 22, a receipt is printed and communicated to the customer in order to help him to remember the sum deducted, the debit date and his new balance after purchase.

Independently of the alternative implementation adopted, the program comprises instructions 222 for repudiating the operation previously described in the case of a negative response to the verification executed by the instruction 210. The program comprises instructions 220 for deducting the validated amount from the balance of the local account and for if necessary printing a receipt, in the case of a positive response to the verification executed by the instruction 210. Finally, instructions 221 are provided for registering the file that hosts the structure 124.

Figure 3:
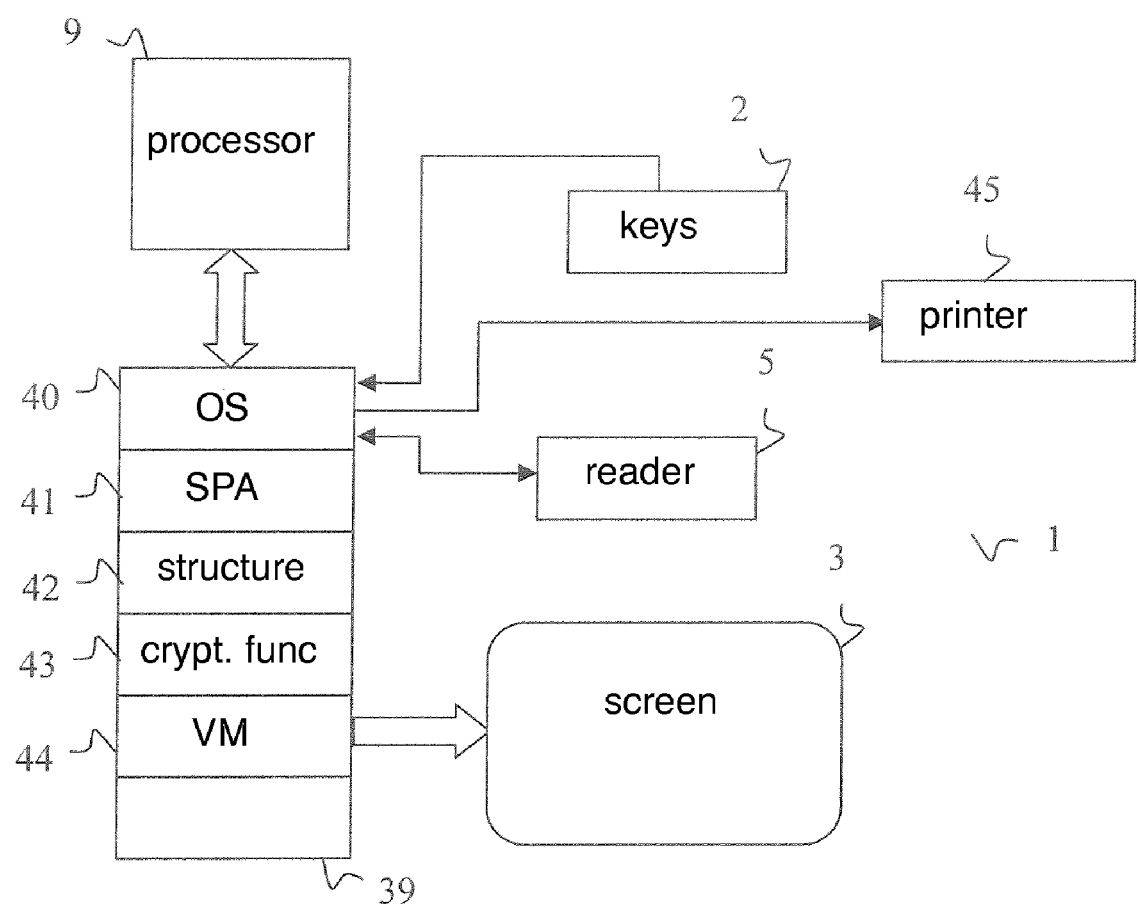
FIG. 3 is a diagram, which illustrates an arrangement of elements according to the disclosure.

A payment terminal is normally arranged to make payments by debiting a centralized account in a bank and crediting another centralized account in the same or another bank or for making payments by debiting a localized account in an electronic purse and crediting a centralized account in a distant bank. To implement the method that has just been described, the payment terminal requires a particular arrangement, which will now be described with reference to FIG. 3.

To make electronic payments, the terminal 1 comprises a processor 9 and a memory 39. The memory 39 comprises a permanent memory part in which programs and data reside and a random access memory part in which the program or programs to be executed are loaded, from the permanent memory or telecommunication means, and the data necessary for the execution of the programs, from the permanent memory, or telecommunication means, of the reader 5, keys of the keypad 2 or of the screen 3 when the data are associated with details pointed to by a user on the screen 3.

In the memory 39, an operating system 40 is arranged to manage, during execution by the processor 9, the peripherals, which are a printer 45, the reader 5, the keypad keys 2 and the screen 3 in order to enter, display, write or print data. The operating system 40 is also arranged to manage programs and fields contained in memory 39. Among the programs, one or more cryptographic processing programs 43 and a secure payment application program 41 according to examples of the disclosure are found. Among the files, there are found a video memory 44 for display on the screen 3 and at least one file 42 containing one or more examples of the structure 124. The structure 124 is arranged to list at least one customer identifier such as, by way of illustration, his surname, his first name and/or his address. Advantageously, in the structure 124, a PIN, standing for personal identification number, preferably in enciphered form, and an amount are associated with the customer identifier. The amount is for example that of a balance and possibly that of an expenditure or a payment in, dated like a passbook. The program 41 comprises the instructions previously explained with reference to FIGS. 4, 6 and 7. In a variant, the program 41 comprises the instructions 123 for twinning a particular example of the structure 124 with a particular hardware information medium 7 by means of the reader 5, either by writing in the structure 124 a reference read on the medium 7, or by writing on the medium 7 at least one customer identifier listed in the structure 124. In the first case it is the reading means of the reader 5 that are used and the structure 124 contains the reference of the medium 7 after twinning. In the second case the reader 5 is provided with writing means so that the medium 7 contains, after twinning, a copy of at least one customer identifier contained in the structure 124.

Naturally the present disclosure and/or claims are not limited to the embodiments described by way of example.

It will be understood that other electronic devices can be produced so that the same example of a data structure is then updated locally by payments and provisioning made on the electronic device on behalf of the customer identified.

Although the present disclosure has been described with reference to one or more examples, workers skilled in the art will recognize that changes may be made in form and detail without departing from the scope of the disclosure and/or the appended claims.

What is claimed is:

1. Electronic payment terminal comprising:
   a data entry device,
   a processor, and
   a memory containing:
      a structure arranged to list at least one customer identifier, a personal identification number and an amount, corresponding to a local credit and/or debit account for making at least one purchase, resident in said payment terminal, all associated, and entirely managed in said payment terminal in order to settle a financial transaction without having recourse to a remote centralized credit and/or debit account; and
      a program comprising instructions for storing in at least one of said structure or a copy of said structure after entry, said customer identifier and said personal identification number,
   said payment terminal being configured to perform locally at least one of a debit or credit operation on the local credit and/or debit account.

2. Electronic payment terminal according to claim 1, wherein the payment terminal comprises means of reading a hardware information medium and wherein said program comprises instructions for twinning said hardware information medium with at least one of said structure or a copy of said structure.

3. The electronic payment terminal of claim 1 and further comprising a non-transitory computer readable medium comprising a payment terminal program stored thereon, which includes program code for performing a method of making a payment locally when said program code is functioning on the payment terminal, the method comprising:
   detecting, from said payment terminal, a signal for finding said local credit and/or debit account, resident in the payment terminal;
   associating, in the payment terminal, said local credit and/or debit account to said customer;
   linking to said local credit and/or debit account said personal identification number chosen by the customer and recording said local credit and/or debit account in the payment terminal; and
   performing locally at least one of a debit or a credit operation with the payment terminal on the local credit and/or debit account within said payment terminal, in response to detection of the signal.

4. Method for making a payment locally in a payment terminal that comprises a processor and a memory, the method comprising:
   detecting, from said payment terminal, a signal for finding a local credit and/or debit account, resident in said payment terminal for making at least one purchase, and entirely managed in said payment terminal in order to settle a financial transaction without having recourse to a remote centralized account;
   associating, in said payment terminal, said local credit and/or debit account to a customer;
   linking to said local credit and/or debit account a personal identification number chosen by the customer and recording said local credit and/or debit account in said payment terminal, and
   performing locally at least one of a debit or a credit operation with the payment terminal on the local credit and/or debit account within said payment terminal, in response to detection of the signal.

5. Method according to claim 4, wherein, in the step of associating the local credit and/or debit account with the customer, a hardware medium is twinned with said local credit and/or debit account.

6. Method according to claim 5, wherein, in the step of finding said local credit and/or debit account, the payment terminal identifies the local credit and/or debit account by using said hardware medium.

7. Method according to claim 6, wherein the method comprises debiting in the payment terminal said local credit and/or debit account with an amount to be deducted entered by a manager of the payment terminal after validation of said amount to be deducted by using the personal identification number.

8. Method according to claim 7, wherein a receipt is printed in the step of debiting said amount to be deducted.

9. Method according to claim 5, wherein the method comprises crediting in the payment terminal said local credit and/or debit account with an amount to be added entered by a manager of the payment terminal.

10. Method according to claim 9, wherein a receipt is printed in the step of crediting said amount to be added.

11. A non-transitory computer readable medium that can be read by a payment terminal and comprising a computer program product stored thereon, which includes program code for implementing a method of making a payment locally when said program is functioning on the payment terminal, the method comprising:

detecting, from said payment terminal, a signal for finding a local credit and/or debit account, resident in the payment terminal for making at least one purchase, and entirely managed in said payment terminal in order to settle a financial transaction without having recourse to a remote centralized account;

associating, in the payment terminal, a local credit and/or debit account to a customer;

linking to said local credit and/or debit account a personal identification number chosen by the customer and recording said local credit and/or debit account in the payment terminal; and performing locally at least one of a debit or a credit operation with the payment terminal on the local credit and/or debit account within said payment terminal, in response to detection of the signal, to settle the financial transaction without having recourse to the remote centralized account.

* * * * *